UNITED STATES PATENT OFFICE.

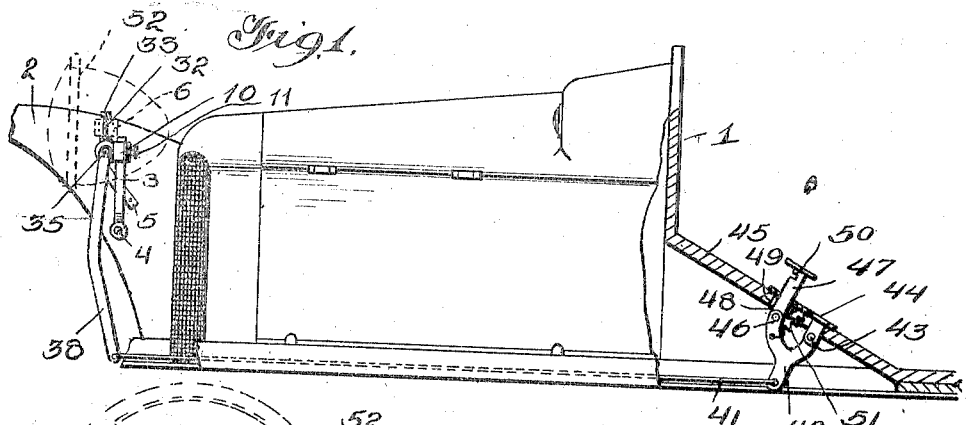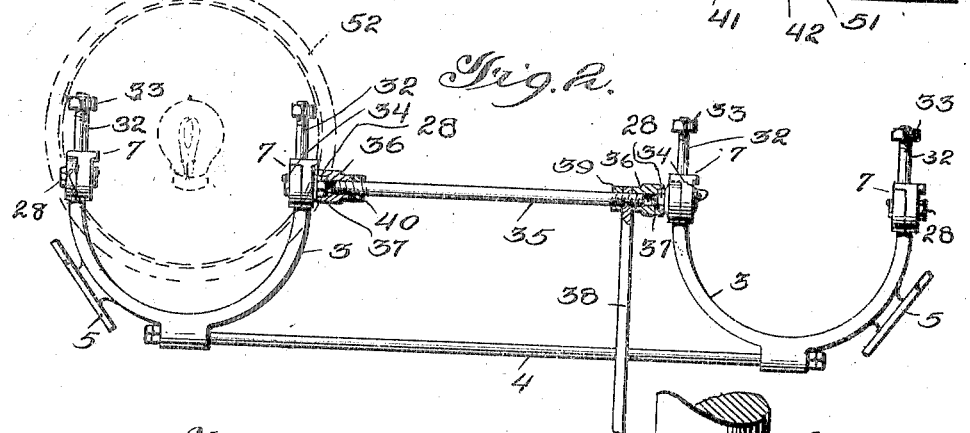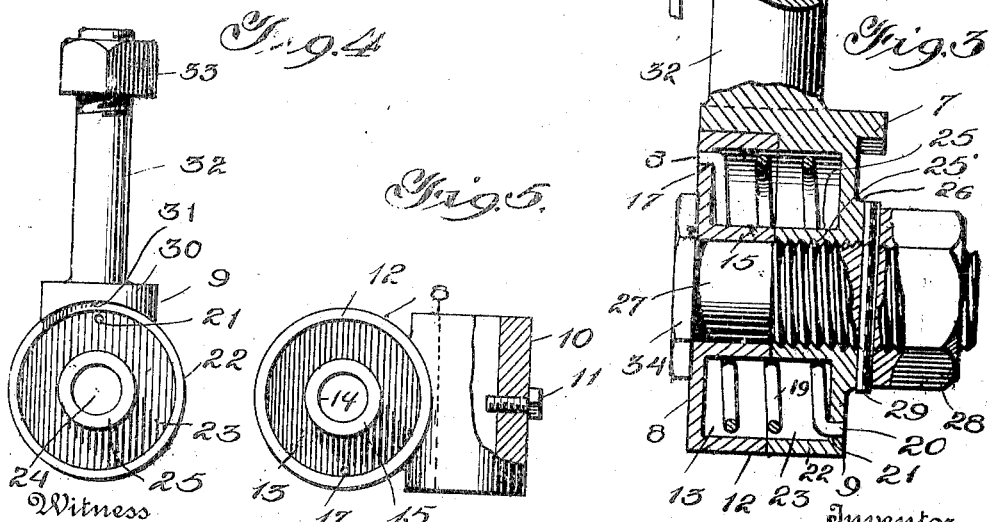

WILLARD PENNOCK, OF MINERVA, OHIO.

TILTING DEVICE FOR HEADLIGHTS.

1,322,045.  Specification of Letters Patent.  Patented Nov. 18, 1919.

Application filed January 20, 1917. Serial No. 143,420.

*To all whom it may concern:*

Be it known that I, WILLARD PENNOCK, a citizen of the United States, residing at Minerva, in the county of Stark and State of Ohio, have invented a new and useful Tilting Device for Headlights, of which the following is a specification.

My invention relates to devices for tilting headlights and has more especial reference to devices of this character which are arranged to tilt the headlight of an automobile or other vehicle into a forward angle to direct the rays of light downwardly upon the road in front of the automobile to prevent the glaring of the lights upon an approaching vehicle.

The object of the present invention is to provide a device for tilting headlights, of an automobile or other vehicle, into a forward position directing the rays of light upon the roadway directly in front of the automobile to prevent the glaring of the lights upon an approaching vehicle.

Another object is to provide a tilting device of the character referred to which may be operated in the manner mentioned and which may be quickly and readily attached to any automobile or similar vehicle, the headlights usually carried by such vehicles being easily mounted upon said device.

A further object of the invention is to provide means for tilting the headlights forwardly and holding them in said tilted position until such time as it is desired to again direct the rays of light in the normal direction.

With these objects in view the invention consists in the novel construction and arrangement of parts, hereinafter described, illustrated in the accompanying drawings, and particularly pointed out in the appended claim, it being understood that various changes in the form, proportions, size and minor details of construction may be made within the scope of the appended claim without departing from the spirit or sacrificing any of the advantages of the invention.

In the drawings:

Figure 1 is a side elevation, partly in section, of a vehicle provided with an embodiment of my invention.

Fig. 2 is a front elevation, with parts broken away, of the lamp brackets showing the tilting device connected thereto.

Fig. 3 is an enlarged sectional view through one of the tilting brackets which is mounted upon the usual yoke, the headlights being carried by said brackets.

Figs. 4 and 5 are interior face views of the two members of which each bracket is composed.

Similar numerals of reference indicate corresponding parts throughout the several figures of the drawings.

Referring more especially to the construction illustrated in the accompanying drawings, the numeral 1, indicates generally the body of an automobile of any well known construction, upon the fenders 2, of which are mounted the usual lamp yokes 3, of any usual form, said yokes being rigidly attached to the fenders, and connected to each other by means of a tie rod 4. Each of said yokes is provided with a plate 5, by means of which it is attached to the adjacent fender. In the usual construction the headlights are rigidly mounted upon said yokes, the ordinary sockets 6, of the headlights being slipped over the upper free extremities of the yokes.

In the present invention the tilting devices generally indicated by the numeral 7, are carried upon the upper, free extremities of the yokes 3, and these tilting devices in turn carry the headlights as will be hereinafter described. Each of the tilting devices 7 comprises the stationary member 8 and the rocking member 9, the member 8 having a vertically disposed sleeve 10, which is arranged to fit upon the upper extremity of an arm of the yoke 3, a set screw 11 being provided through said sleeve for securely attaching the tilting device to the yoke. The member 8 is provided with the cylindrical socket portion 12 having a depression or cavity 13 therein for the purpose of housing the coil spring as will be hereinafter described. A centrally located aperture 14 is provided through the cylindrical portion 12 and an inwardly extending neck 15 is provided around said aperture. An aperture 17 is provided in the back wall of the cylindrical portion 12 for the reception of the extremity of the out-turned end 18 of the coil spring 19, the other extremity 20 of said spring being out-turned and located in a similar aperture 21 located in the back plate of the cylindrical portion 22 of the member 9, said cylindrical portion 22 being provided with a cavity 23, which houses a portion of the spring 19. The cylindrical portion 22 is provided with a centrally located aperture 24 around which is located the inwardly disposed neck 25, the interior of said neck being screw threaded as shown at 25'.

A boss 26 is formed around the central aperture 24 of the member 9. The members 8 and 9 are held together by means of the bolt 27 which is passed through the central apertures 14 and 24 of said members, a nut 28 being provided upon the screw threaded extremity of said bolt. For the purpose of holding the nut and bolt against rotation with reference to the member 9, a pin 29 is passed through a suitable aperture formed through the bolt, the extremities of said pin being seated in sockets formed half in the boss 26 and half in the nut 28. A boss 30 is provided at the upper side of the cylindrical socket portion 22 of the member 9, said boss overhanging the socket portion 12 of the member 8 and provided with a curved undersurface 31 formed to receive said socket portion 12. An integral vertical bolt 32 extends upwardly from the boss 30 for the purpose of receiving one of the lamp sockets 6, a nut 33 being provided upon the upward screw threaded extremity of the bolt for the purpose of holding the lamp securely upon the bolt. It will thus be seen that each headlight will be carried upon the two bolts 32 of the adjacent yoke 3.

Each bolt head 34 as well as each of the nuts is preferably shown as hexagonal in order that the parts may be interchangeable. The two inner tilting devices are connected together by means of a rock shaft 35, said rock shaft being provided at opposite extremities with right and left hand screw threads, a socket member 36 being located upon each end of said rock shaft, said socket members being provided with hexagonal sockets 37 arranged to engage the adjacent bolt heads 34 or nuts 28. A rock arm 38 is located upon said rock shaft adjacent one of said socket members, a jam nut 39 being provided for the purpose of holding said rock arm and socket member against movement upon the shaft and a jam nut 40 is located upon the shaft adjacent the other socket member. A rod or connecting cable 41 is attached to the lower extremity of the rock arm 38 and extends backward through the hood of the vehicle to the lower extremity of the bifurcated lever 42, one end of said lever being pivoted to a plate 44 which is attached to the floor 45 of the vehicle, the other arm 46 of said lever being pivotally connected to a foot pedal 47, the knuckle 48 forming a stop against the lower surface of the plate 44 to normally hold the device in the position shown in Fig. 1 of the drawings. The foot pedal 47 extends through a suitable slot 49 formed in the floor and in the plate 44 and is provided with a notch 50 for the purpose of engaging the plate at the edge of the slot to hold the device in the tilted position when desired. A small spring 51 is shown connected between the plate 44 and the arm 46 of the lever 42 for the purpose of normally holding the lever in the position shown in Fig. 1, but it will be seen from an inspection of the drawings that the springs 19 will tend to hold the device in this position normally thus holding the headlights 52 in vertical position directing the rays from the headlights straight ahead of the vehicle.

When it is desired to direct the rays of light from the headlights upon the roadway directly in front of the vehicle in order to prevent glaring the lights upon an approaching vehicle, the foot pedal 47 is depressed and moved into position to bring the notch 50 into engagement with the edge of the plate 44 at the slot 49, thus rocking the shaft 35 through the link 41 and rock arm 38. As the shaft 35 is rocked forwardly, the two bolts 27 which are engaged by the socket members upon said shaft will also be rocked thus moving the headlights at an angle to direct the rays of light from said headlights upon the roadway directly in front of the vehicle. It will be seen that this turning movement of the bolts 27 is against the pull of the springs 19 and when the foot pedal 47 is released the springs will immediately throw the several members back into the normal position, the coil springs 19, not only holding the several parts of the device in the normal position, but also prevent any rattling of the several members of the device and also exert an end thrust against the members 8 and 9 holding the same directly against the bolt head and nut respectively.

I claim:

In combination with a pair of headlights and supporting yokes therefor, a sleeve fixedly connected to each free end of each yoke, a horizontally disposed cylindrical portion formed upon each of said sleeves, said cylindrical portion being closed at one end, a bolt pivotally connected to said cylindrical portion, the head of said bolt engaging the outer surface of said closed end, a rocking cylindrical portion having a closed end and threaded upon said bolt, the open end of said rocking cylindrical portion being adjacent the open end of said stationary cylindrical portion, a coil spring housed within said cylindrical portions and attached to one of said portions at each end, an upstanding stem upon each of said rocking cylindrical portions adapted to carry the said headlights, the said coil spring being designed to normally hold said stems vertical, a rock shaft provided with sockets which receive the inner bolt heads of both yokes, a rock arm rigidly connected to said rock shaft and means for rocking said rock arm against the pull of said springs to tilt said headlights.

In testimony that I claim the above, I have hereunto subscribed my name.

WILLARD PENNOCK.